United States Patent [19]

Daido et al.

[11] Patent Number: 4,640,380
[45] Date of Patent: Feb. 3, 1987

[54] APPARATUS FOR CONTROLLING A STEERING FORCE OF A HANDLE IN AUTOMOBILES

[75] Inventors: Toshihiko Daido; Hideo Matsubara; Shuzo Hirakushi, all of Nara, Japan

[73] Assignees: Koyo Seiko Kabushiki Kaisha; Koyo Jidoki Kabushiki Kaisha, both of Osaka, Japan

[21] Appl. No.: 720,814

[22] Filed: Apr. 8, 1985

[30] Foreign Application Priority Data

Apr. 9, 1984 [JP] Japan .................................. 59-69119

[51] Int. Cl.$^4$ ............................................... B62D 5/08
[52] U.S. Cl. ...................................... 180/141; 60/434; 91/372
[58] Field of Search ........................ 180/141, 142, 143; 60/434; 91/372, 375 A

[56] References Cited

U.S. PATENT DOCUMENTS

| 2,791,287 | 5/1957 | Stolte | 180/143 |
|---|---|---|---|
| 3,433,127 | 3/1969 | Thompson | 91/372 |
| 4,047,728 | 9/1977 | Takahashi et al. | 180/141 |
| 4,320,812 | 3/1982 | Takaoka et al. | 180/143 |

Primary Examiner—John J. Love
Assistant Examiner—Donn McGiehan
Attorney, Agent, or Firm—Robert E. Burns; Emmanuel J. Lobato; Bruce L. Adams

[57] ABSTRACT

Apparatus for controlling a steering force of a handle in an automobile having a power steering system in which a driving shaft of an auxiliary fluid pump for obtaining pressure oil for a hydraulic reaction chamber of the power steering system is made common to a driving shaft of a fluid pump for the power steering system to increase a quantity of discharge and oil pressure of the auxiliary pump. Oil pressure with respect to the hydraulic reaction chamber is controlled by the speed and steering angle of the automobile to obtain a proper steering force.

14 Claims, 3 Drawing Figures

APPARATUS FOR CONTROLLING A STEERING FORCE OF A HANDLE IN AUTOMOBILES

FIELD AND BACKGROUND OF THE INVENTION

The present invention relates to an apparatus for controlling a steering force of a hande in an automobile, and more specifically to an apparatus for controlling a steering force of a handle for controlling operation of a power steering system in response to the speed or steering angle of the automobile.

It is widely known, for example, from U.S. Pat. Nos. 3,433,127, 4,034,825, 4,119,172 and the like that rotational torque from a steering handle is transmitted to the travelling wheels of a vehicle after the torque has been increased by a power steering system provided with an elastic torsional bar. Particularly, the latter U.S. Pat. No. 4,034,825 discloses that when the speed of the automobile is high, the function of the power steering system is decreased whereas when the speed is low, the function is increased.

In such a power steering system, rotation of a rotary shaft of the engine, for example, is transmitted to an oil pump by a pulley and an endless belt extended over the pulley, and oil in an oil tank is supplied to the power steering system by the oil pump to assist the steering force. Further, rotation of the counter shaft of the transmission of the engine is transmitted to an auxiliary oil pump, and oil from the oil tank is suctioned by the auxiliary oil pump. A throttle valve is provided on an outlet of the auxiliary oil pump and, oil having passed through the throttle valve is again returned to the oil tank and pressurized oil is introduced from between the outlet of the auxiliary oil pump and the throttle valve to a hydraulic reaction chamber for controlling the torsion of the torsional bar to control the function of the power steering system. This is, the auxiliary pump increases the number of revolutions thereof proportional to the vehicle speed by the counter shaft of the transmission to increase the quantity of discharge. Accordingly, at the time of high speed, high oil pressure is applied to the throttle valve, as a consequence of which high pressure is applied to the hydraulic reaction chamber to weaken the function of the power steering system thereby making the handle operation heavy. However, there is a drawback at low speed rotation of that in the counter shaft, the quantity of discharge of the auxiliary pump is small to failing to obtain a great hydraulic reaction. There is a further drawback in that since the counter shaft is positioned away from the oil tank or hydraulic reaction chamber, a large space is required for housing the piping. When the vehicle speed is low, the quantity of discharge from the auxiliary pump is also insufficient whereby pulsation and fluctuation in pressure occur.

As shown in FIG. 3, A, characteristics of torque/pressure of the power steering system is such that at the time of high speed, the steering force becomes excessively small, and it is difficult to maintain the straight-ahead condition of the automobile and the steering handle is excessively operated often imparting uneasiness to the vehicle operator. Therefore, the hydraulic reaction chamber as described above is provided, and the reaction pressure is controlled by the vehicle speed to thereby widen a senseless zone of the hydraulic reaction chamber as shown in FIG. 3, B and C. However, as will be understood from the characteristics of B and C, since the rise in pressure relative to the increase in torque after the passage of the senseless zone is acute, the steering force is suddenly small when the steering torque exceeds the senseless zone such as in cases where rapid handle operation is effected or the steering angle is great, and the handle is excessively operated, which states may not be improved. Where control is made merely by vehicle speed, in the characteristics of torque/pressure, a senseless zone portion is merely widened, and the contour of the characteristic curve beyond the sensless zone is the same, sometimes lacking in a handle-operating feeling.

SUMMARY OF THE INVENTION

It is an object of the present invention to provide an apparatus for controlling a steering force of a handle in an automobile which can sufficiently increase the quantity of discharge and oil pressure of an auxiliary pump for obtaining presurized oil for a hydraulic reaction chamber of a power steering system to obtain a pressure characteristic without a discontinuous feeling.

It is a further object of the invention to provide an apparatus for controlling a steering force of a handle in an automobile which can detect steering angles of the handle and steering wheels as well as speed of the automobile to accurately control presurized oil to the hydraulic reaction chamber including information of the steering angle to obtain an adequate steering force.

According to the present invention, there is provided an apparatus for controlling a steering force of a handle in an automobile comprising a power steering system for assisting a steering force of a steering handle in an automobile by a fluid from a fluid pump, and a hydraulic reaction chamber for applying a force opposite the steering force of the steering handle by the power steering system to the steering handle by the fluid, the apparatus comprising an auxiliary pump having a driving shaft common to a driving shaft of a fluid pump to suction a fluid for the power steering system, a fluid passageway connected to an outlet of the auxiliary fluid pump and a fluid tank for fluid, a flow control device for controlling the fluid by the speed of the automobile and the steering angle, a throttle means for fluid provided in the fluid passageway on the outlet side of the flow control device, and a fluid passageway for a hydraulic reaction chamber one end of which is in communication with a portion between the outlet side of the fluid control device and the throttle means and the other end being in communication with the hydraulic reaction chamber.

In the handle steering force control apparatus according to the present invention, the hydraulic reaction chamber is controlled by an auxiliary pump having a driving shaft common to a fluid pump whose driving source is the power source for the fluid pump for the power steering system, or the automobile engine in the preferred embodiment, and therefore, the auxiliary pump may obtain sufficient quantity of discharge and fluid pressure and obtain the pressure characteristic without a discontinuous feeling. In addition, the mounting space for housing the apparatus may be reduced to make the whole structure smaller. Moreover, since the force acting on the hydraulic reaction chamber may be varied by the conditions of the vehicle speed and the steering angle, the handle operating feeling and maintenance of straight-aheadness may be enhanced.

Other objects, features and effects of the present invention will be apparent from the ensuing detailed description in connection with the embodiment shown in the accompanying drawings.

BRIEF DESCRIPTION OF THE DRAWIINGS

DESCRIPTION OF THE PREFERRED EMBODIMENTS

Figure 1:
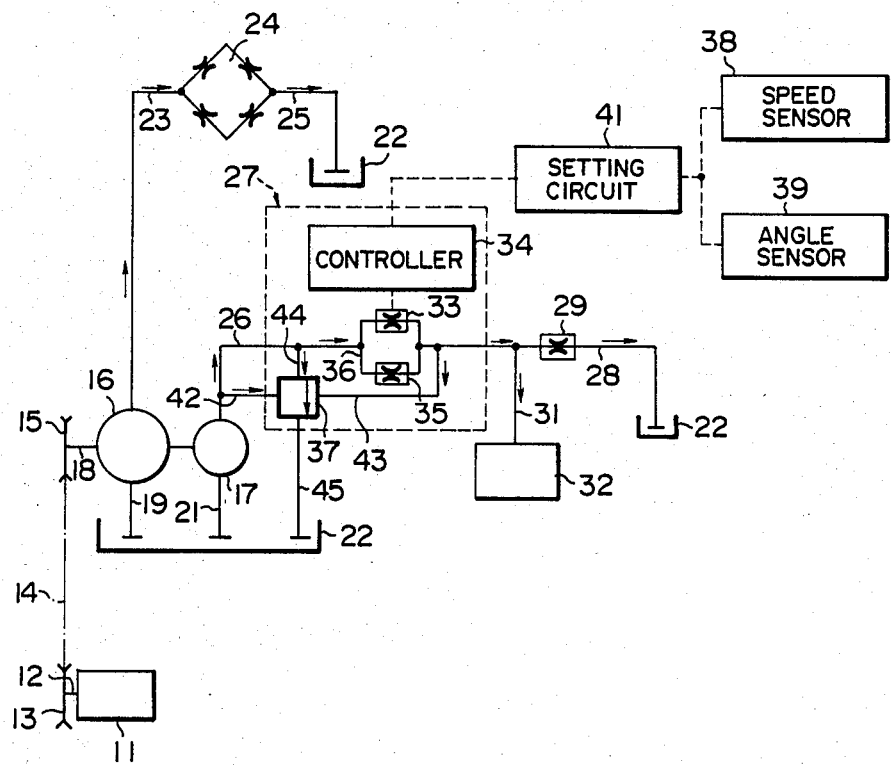
FIG. 1 is a schematic view showing a first embodiment of the present invention.

The present invention will now be described in connection with the embodiments shown in the accompanying drawings. Referring first to FIG. 1 which shows a first embodiment of the present invention, a pulley 13 is mounted on a rotary shaft 12 of the engine 11 of the automobile. This pulley 13 causes a pulley 15 to rotate through an endless belt 14. The pulley 15 is mounted on a common driving shaft 18 of a composite oil pump having a main oil pump 16 and an auxiliary oil pump 17. Suction pipes 19, 21 of the pumps 16, 17, respectively, are connected to a source of fluid comprising an oil tank 22, and pressurized oil discharged from the main pump 16 is supplied to the power steering system 24 through an outlet pipe 23. The pressurized oil having passed through the system 24 is again returned to the oil tank 22 through an outlet pipe 25. On the other hand, pressurized oil discharged from the auxiliary oil pump 17 is fed to a flow control device 27 through an outlet pipe 26. Pressurized oil having passed through the flow control device 27 is again returned to the oil tank 22 through a fixed throttle valve 29. Pressurized oil from the flow control device 27 is also supplied to a hydraulic reaction chamber 32 by a branch pipe 31. The hydraulic reaction chamber 32 which is provided to control application of reaction to the power steering will not be described in detail here since it is well known from the aforementioned U.S. Pat. No. 4,034,824, etc.

The flow control device 27 comprises a variable throttle valve 33 connected to the outlet pipe 26, a controller 34 for controlling the throttle amount of the variable throttle valve 33, a by-pass passageway 36 of the variable throttle valve 33 having a fixed throttle valve 35, and a control valve 37 for controlling the pressurized oil supplied to the variable throttle valve 33. The controller 34 is controlled by a signal from a setting circuit 41 which receives signals from a vehicle speed sensor 38 for detecting the speed of the vehicle to provide a signal corresponding to the speed and from a steering angle sensor 39 for electrically extracting the number of revolutions and rotational angle of the handle, for example, to detect the angle of the steering wheel to provide a signal corresponding to said angle, to set the throttle amount of the variable throttle valve 33. The sensors 38 and 39 are well known and will not therefore be described in detail. The flow control valve 37 detects the quantity of oil at the inlet and outlet of the variable throttle valve 33 to return unnecessary oil to the oil tank 22, and the opening degree of the valve 37 is adjusted by oil pressure within the detection pipes 42 and 43 one ends of which are connected to the outlet pipe 26 and outlet pipe 28, respectively. That is, if the oil pressure at the outlet of the variable throttle valve 33 is lower than the oil pressure of the outlet pipe 26, the opening degree of the control valve 37 is enlarged. The control valve 37 has its inlet side connected to the outlet pipe 26 by a pipe 44 and its outlet side connected to the oil tank 22 by a pipe 45.

Next, the operation will be described. When the common shaft 18 of the composite pump is rotated by rotation of the engine 11, the main pump 16 and the auxiliary pump 17 are operated. Pressurized oil discharged from the main pump 16 is supplied from the outlet pipe 23 to the steering system 24 to assist the steering force and returned from the outlet pipe 25 to the oil tank 22. When the vehicle speed is low, the variable throttle valve 33 of the flow control device 27 is closed by the vehicle speed sensor 38, and a major portion of the oil discharged from the auxiliary pump 17 is circulated by the flow control valve 37 to the oil tank 22. The quantity of oil passing through the fixed throttle valve 29 is very small and the throttling pressure is very small. Thus, the oil pressure exerted on the hydraulic reaction chamber 32 is also very low, and the pressure generated therein is also very small.

Figure 3:
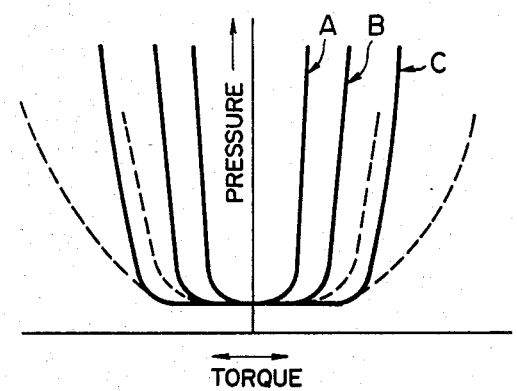
FIG. 3 is a graph showing torque—pressure characteristics of a power steering apparatus according to the present invention together with an example of a characteristic of the prior art.

When the vehicle speed increases, a signal corresponding to the speed is applied from the vehicle speed sensor 38 to the setting circuit 41, and the controller 34 operates the variable throttle valve 33 so as to increase the opening area of the variable throttle valve 33 by the output signal from the setting circuit 41. Thereby, the oil pressure within the outlet pipe 26 decreases, and this decrease in oil pressure is transmitted to the flow control valve 37 through the detection pipe 42 to close the valve 37 to decrease the quantity of oil returned to the oil tank 22. The flow of oil passing through the fixed throttle valve 29 is also increased by the increase in flow of oil within the outlet pipe 28 to generate the throttling pressure. Oil is introduced at the increased throttling pressure to the hydraulic reaction chamber 32 through the branch pipe 31 to increase the reaction relative to the power steering system 24. Thereby, at the time of high speed, the function of the power steering system 24 is weakened. When the steering angle is great, the function of the power steering system 24 is weakened by the steering angle sensor 39. As shown by the dotted lines of FIG. 3, the rise in pressure with respect to the increase in torque after the passage of the senseless zone can be increased more slowly or gradually as compared with prior art, and the steering force is rapidly decreased when the steering torque passes beyond the sens less zone and the steering handle is excessively operated, and thus the disadvantages encountered in prior art may be improved.

Figure 2:
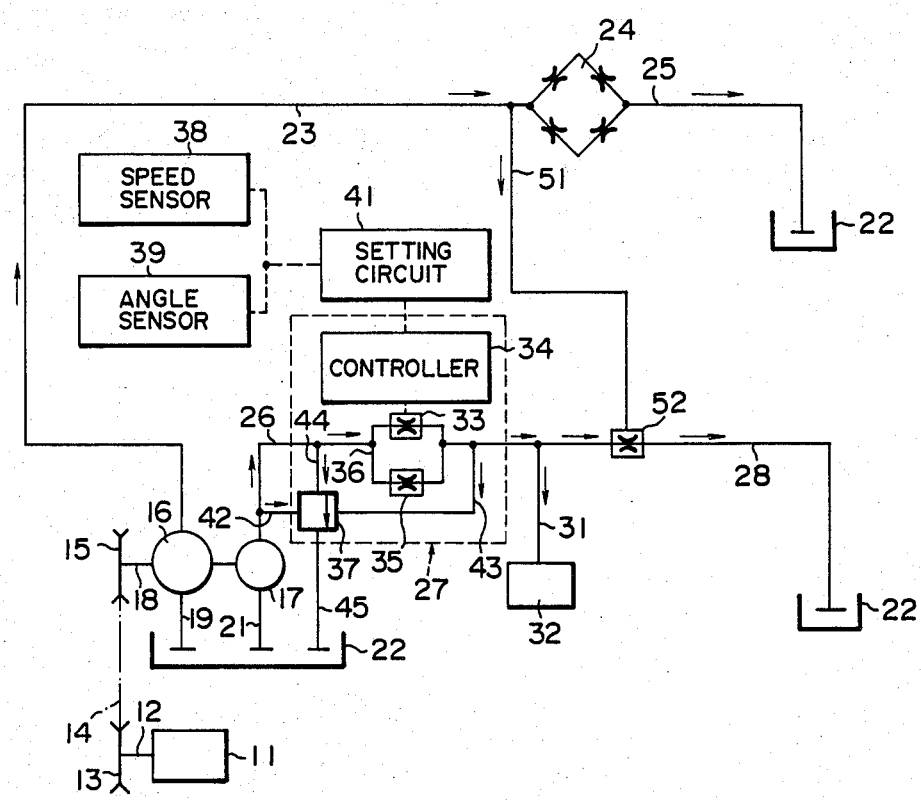
FIG. 2 is a schematic view showing a second embodiment of the present invention.

FIG. 2 shows a second embodiment of the present invention, in which elements similar to those of the aforementioned first embodiment are indicated by like reference numerals and the detailed description thereof will be omitted. In the second embodiment, there is provided, in place of the fixed throttle valve 29 used in the first embodiment, a variable throttle valve 52 in which one end of a branch pipe 51 is brought into communication with the outlet pipe 23 from the main pump 16 and the opening degree thereof is controlled by pressurized oil of the outlet pipe 23, Thereby, reaction from the road surface may be sufficiently transmitted to the handle to obtain a good characteristic having a handle-operating feeling.

While the present invention has been illustrated and described in connection with the specific embodiments, it will be apparent to those skilled in art that various changes in shape and details may be made without departing the features and scope of the present invention.

What is claimed is:

1. A handle steering force control apparatus for controlling a steering force of a handle in an automobile having a power steering system for assisting a steering force of the steering handle by a fluid from a fluid pump, and a hydraulic reaction chamber for applying a force opposite the steering force of the steering handle to the steering handle by the fluid, the steering force control apparatus comprising:
   an auxiliary pump having a driving shaft common to a driving shaft of a fluid pump to suction a fluid for the power steering system,
   a fluid passageway connected between an outlet of the auxiliary pump and a fluid tank for fluid,
   a flow control device provided in said fluid passageway to control the fluid by the speed of the automobile and the steering angle,
   A throttle means for said fluid provided in the fluid passageway on the outlet side of the flow control device, and
   a fluid branch passageway for a hydraulic reaction chamber, one end of the fluid branch passageway being in communication with a portion of the aforesaid fluid passageway between the outlet side of the fluid control device and the throttle means and the other end thereof being in communication with the hydraulic reaction chamber.

2. The handle steering force control apparatus of claim 1, wherein said flow control device comprises a variable throttle valve the opening of which is adjusted by an electric signal corresponding to the speed of said automobile and the steering angle, and a flow control valve the opening degree of which is adjusted by a difference of liquid pressure of said fluid passage between the inlet and outlet sides of said variable throttle valve, and when the liquid pressure at said inlet side of said throttle valve is higher than that at said outlet side of said throttle valve, said fluid is returned to said fluid tank.

3. The handle steering force control apparatus of claim 1, wherein said throttle means comprises a fixed throttle valve.

4. The handle steering force control apparatus of claim 1, wherein said throttle means comprises a variable throttle valve whose opening degree is adjusted by the pressure of the liquid applied from said fluid pump to said power steering system.

5. A steering force control system for a power steering system of a vehicle of the type having a reaction chamber responsive to fluid pressure applied thereto for producing a reaction force to counteract the steering force produced by turning a steering wheel, the steering force control system comprising: a source of fluid; a pump connected to the source of fluid for pumping fluid therefrom to produce a fluid pressure; flow control means having an inlet side connected to receive the fluid pressure from the pump and an outlet side connected to the reaction chamber to apply fluid pressure thereto and operative to control the flow of fluid to the reaction chamber in accordance with the speed of the vehicle and the steering angle; and throttling means connected to the outlet side of the flow control means for continually throttling the flow of fluid discharged from the outlet side of the flow control means and returning the throttled fluid to the source of fluid.

6. A steering force control system according to claim 5; wherein the flow control means comprises a variable throttle valve having a variably settable valve opening the degree of opening of which is controlled in accordance with the speed of the vehicle and the steering angle for controlling the flow of fluid to the reaction chamber, and valve means responsive to the pressure difference across the variable throttle valve for controlling the quantity of fluid flowing through the variable throttle valve.

7. A steering force control system according to claim 6; including a fluid passageway connecting the outlet of the pump to the source of fluid, the variable throttle valve and the throttling means being connected in the fluid passageway with the variable throttle valve being upstream of the throttling means, a first branch passageway connecting the fluid passageway at a point upstream from the variable throttle valve to the source of fluid, the valve means being connected in the first branch passageway for returning fluid pumped by the pump to the source of fluid in accordance with the pressure difference across the variable throttle valve, and a second branch passageway connecting the fluid passageway at a point between the variable throttle valve and the throttling means to the reaction chamber.

8. A steering force control system according to claim 7; wherein the throttling means comprises a fixed throttle valve the degree of opening of which is fixed.

9. A steering force control system according to claim 7; wherein the throttling means comprises a variably settable throttle valve the degree of opening of which is variably settable.

10. A steering force control system according to claim 9; including another pump connected to the source of fluid for pumping fluid therefrom to the power steering system, and means responsive to the pressure of the fluid pumped by the another pump for variably setting the degree of opening of the variably settable throttle valve.

11. A steering force control system according to claim 10; whereinn both the pump and the another pump comprise rotary pumps connected to a common rotary shaft.

12. A steering force control system according to claim 5; wherein the throttling means comprises a variably settable throttle valve the degree of opening of which is variably settable.

13. A steering force control system according to claim 12; including another pump connected to the source of fluid for pumping fluid therefrom to the power steering system, and means responsive to the pressure of the fluid pumped by the another pump for variably setting the degree of opening of the variably settable throttle valve.

14. A steering force control system according to claim 13; wherein both the pump and the another pump comprise rotary pumps connected to a common rotary shaft.

* * * * *